United States Patent [19]
Peterson

[11] 4,169,616
[45] Oct. 2, 1979

[54] VALVE AND CYLINDER-ACTUATED LOCK CONTROLLED THEREBY

[75] Inventor: Francis C. Peterson, St. Louis County, Mo.

[73] Assignee: C. Hager & Sons Hinge Manufacturing Company, St. Louis, Mo.

[21] Appl. No.: 836,728

[22] Filed: Sep. 26, 1977

[51] Int. Cl.$^{2}$ .................... E05B 51/00; F16K 11/07

[52] U.S. Cl. .................... 292/144; 70/129; 70/275; 91/433; 137/106

[58] Field of Search .................. 137/106; 91/356, 433, 91/447, 318; 292/144; 70/275, DIG. 48, 129

[56] References Cited

U.S. PATENT DOCUMENTS

| | | | |
|---|---|---|---|
| 1,085,058 | 1/1914 | Messick | 70/275 |
| 2,298,457 | 10/1942 | Berges | 91/318 |
| 2,550,723 | 5/1951 | Ross | 91/318 X |
| 2,770,222 | 11/1956 | Anderson | 91/356 |
| 3,026,676 | 3/1962 | Wenzel et al. | 91/356 X |
| 3,113,590 | 12/1963 | Olson | 91/356 X |
| 3,162,097 | 12/1964 | Allen et al. | 91/422 X |
| 3,722,525 | 3/1973 | Epple | 137/106 |
| 3,811,458 | 5/1974 | Kuhnelt | 137/106 |
| 3,850,082 | 11/1974 | Nussbaumer | 91/461 |
| 3,893,723 | 7/1975 | Boule | 292/144 X |

FOREIGN PATENT DOCUMENTS

| | | | |
|---|---|---|---|
| 1930696 | 12/1970 | Fed. Rep. of Germany | 292/144 |
| 64183 | 2/1926 | Sweden | 292/144 |

*Primary Examiner*—Rodney H. Bonck
*Attorney, Agent, or Firm*—Gravely, Lieder & Woodruff

[57] ABSTRACT

A lock located within a door has a bolt that is extended and retracted by a double acting air cylinder. A single air line extends from the door frame and into the door where it is connected with a valve having two discharge lines that lead to opposite ends of the cylinder. To energize the cylinder and move the lock bolt, a charge of pressurized air is directed to the valve which in turn directs it to one end of the cylinder. The charge of air further causes the valve to reset itself so that the next charge will be directed to the opposite end of the cylinder. Consequently, with successive charges of air the piston rod of the cylinder and the lock bolt move in opposite directions.

16 Claims, 7 Drawing Figures

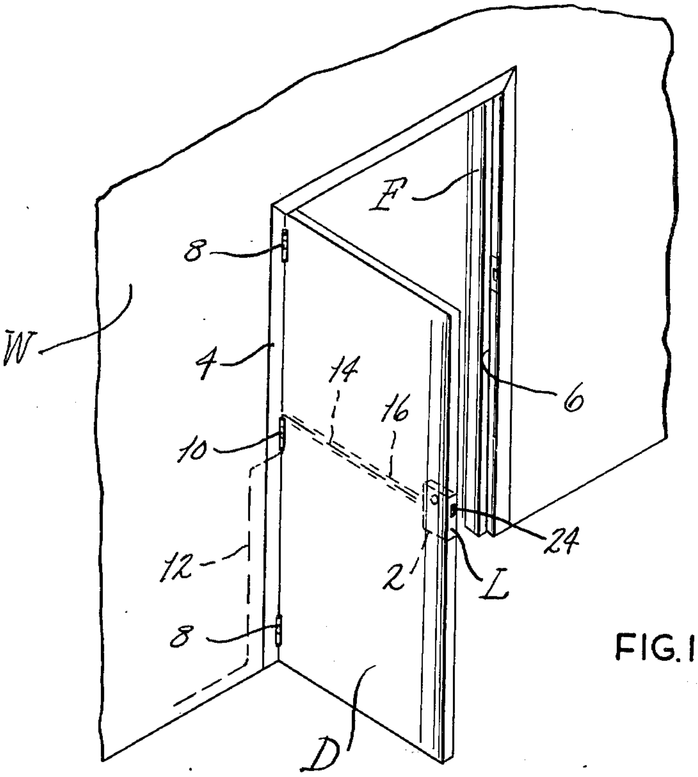
FIG. 1
FIG. 2
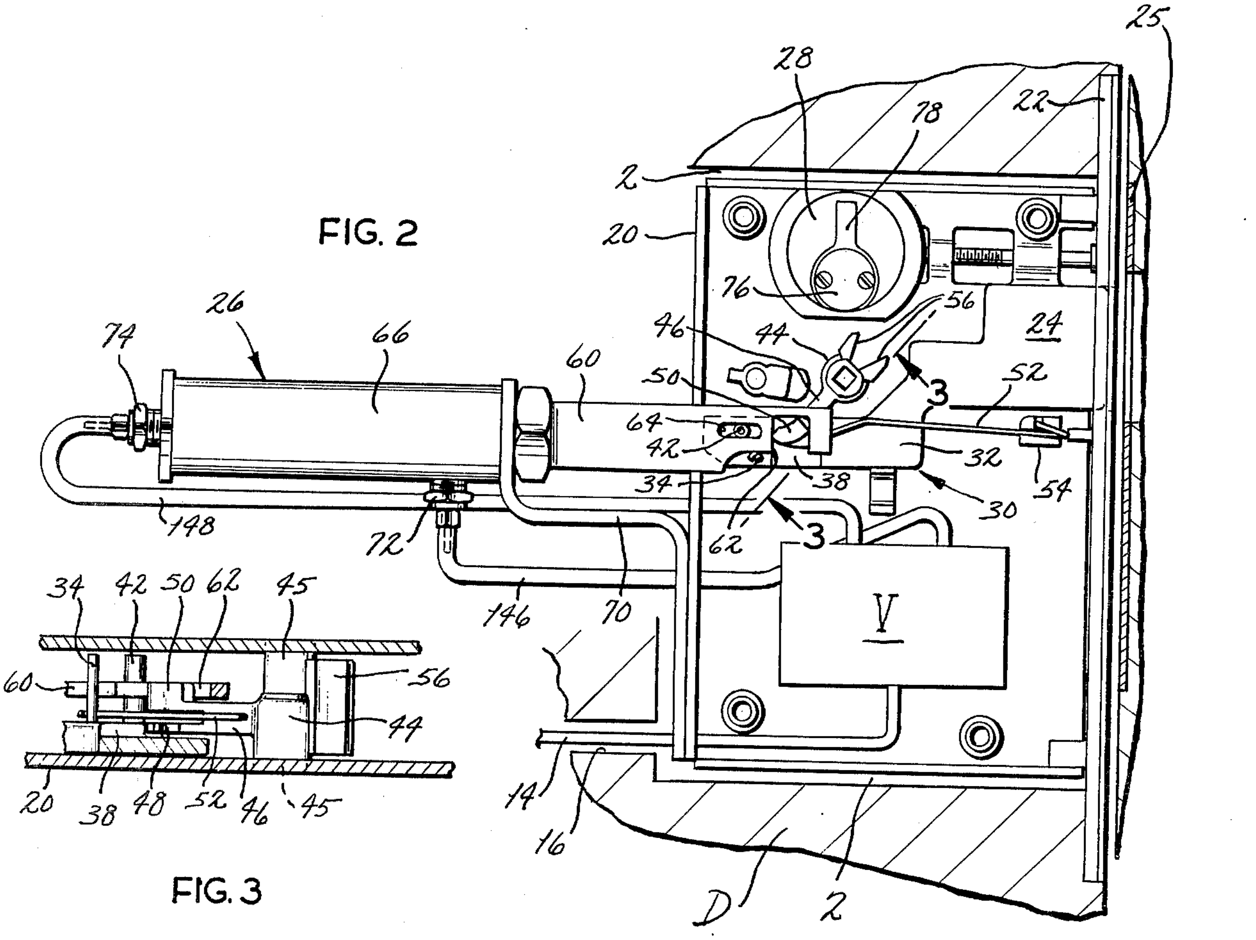
FIG. 3

FIG. 4
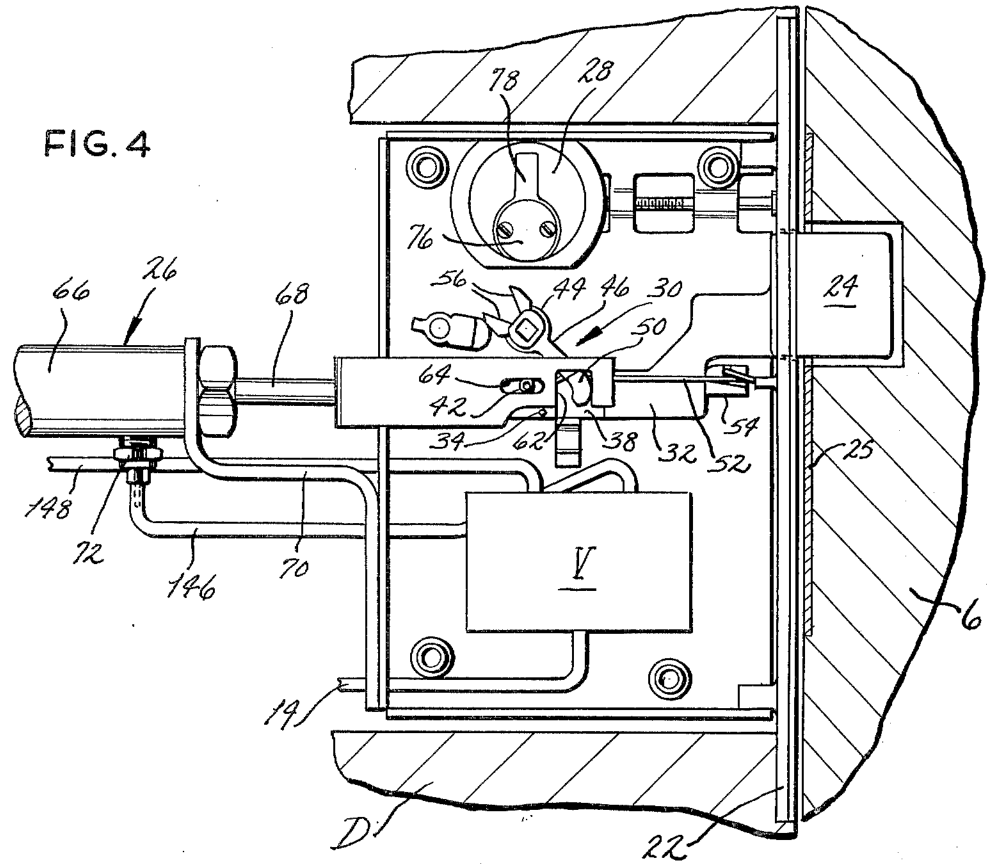
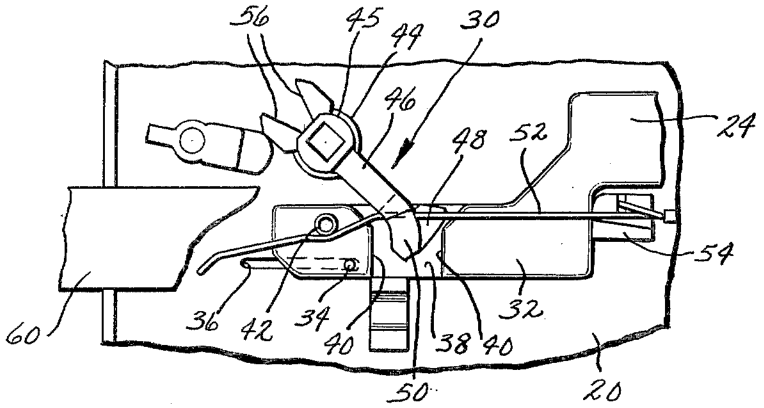
FIG. 5

VALVE AND CYLINDER-ACTUATED LOCK CONTROLLED THEREBY

BACKGROUND OF THE INVENTION

This invention relates to a valve that resets itself, to a combination of the valve and a double acting air cylinder, and to a lock that is controlled through such a valve.

A significant expense in the operation of many large buildings is that of security. To reduce this expense as well as to improve security, many large buildings have doors which are both remotely controlled and remotely monitored. Normally, a large building of the type under consideration has a security office, and from that office doors at critical locations throughout the building are monitored. Many of the doors have locks which are likewise controlled from the single security location.

Perhaps the most common type of remotely controlled lock is the strike-centered variety. A lock of this nature has a keeper or strike which is actuated by a solenoid and when actuated releases the lock bolt that normally projects into it from the door. Strike-centered systems are easily defeated, and therefore do not provide a high degree of security.

Moving the solenoid actuator to the lock itself, that is, into the door, enhances the degree of security. In such a system, the solenoid normally pulls the lock bolt or else releases the lock bolt so it can thereafter be retracted by turning a knob. Since the solenoid is within the door itself, electric wires must be run from the door frame into the door, which is usually not much of a problem. However, Underwriters Laboratories will not approve an installation requiring more than 100 voltamperes, and as a consequence the solenoids are capable of exerting only a very small force. Indeed, at this low power, it is practically impossible to utilize a solenoid for pulling a lock bolt out of its keeper.

Due to the electrical power limitations on doors, some installations now employ compressed air to operate the remotely controlled locks. Normally, buildings of the type under considerations have compressed air lines for operating other equipment, primarily in the heating and air-conditioning systems, so the compressed air is readily available. An air cylinder operating under a moderate pressure furnishes a significantly greater force than a solenoid and is furthermore much more reliable. Perhaps, the best way to bring compressed air into a door is through one of the hinges on which the door is mounted, and a hinge suitable for this purpose is disclosed in U.S. Pat. No. 3,872,541. That hinge, however, is capable of accommodating only one air line, which is adequate for single acting cylinders, but not double acting cylinders. Two hinges are required by the latter, but the hinges are expensive in their own right and are furthermore expensive to install. Indeed, in such an instance two holes extending transversely through the door, would be required, with each hole originating at a different hinge and terminating at the mortise for the door lock.

SUMMARY OF THE INVENTION

One of the principal objects of the present invention is to provide a valve which directs fluid from a single line alternately to two different lines. Another object is to provide a valve of the type stated which upon each activation resets itself so that on one activation compressed air is discharged from one fluid line, and on the next activation from the other, etc. A further object is to provide a valve of the type stated which is simple in construction and inexpensive to make. An additional object is to provide a valve of the type stated which is ideally suited for operating a double acting air cylinder. Still another object is to provide a cylinder-operated door lock, the cylinder of which is supplied with air through a valve of the type stated. These and other objects and advantages will become apparent hereinafter.

The present invention is embodied in a valve having two outlet passages, an inlet passage, and a valve element which shifts between first and second positions. The valve element when in its first position directs pressurized fluid applied at the inlet passage to one of the outlet passages and when in its second position directs pressurized fluid to the other outlet passage. The valve in addition includes means responsive to back pressure in each outlet passage for utilizing the force exerted by the back pressure to change the position of the valve element. The invention also resides in the combination of the valve and a double acting cylinder as well as in the combination of the valve, the double acting cylinder, and a lock bolt operated by a double acting cylinder that is controlled by the valve. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts whenever they occur:

FIG. 1 is a perspective view showing a door having a cylinder-operated lock that is controlled with a valve constructed in accordance with the present invention;

FIG. 2 is a sectional view of the lock in elevation with the lock bolt retracted;

FIG. 3 is a sectional view taken along line 3—3 of FIG. 2 and showing the bifurcated hub of the coupling mechanism for the lock;

FIG. 4 is a sectional view in elevation of the lock with the lock bolt extended;

FIG. 5 is a fragmentary view showing the tines of the bifurcated hub when the lock bolt is in its extended position and with the one tine blocking the lock bolt;

DETAILED DESCRIPTION

Figure 6:
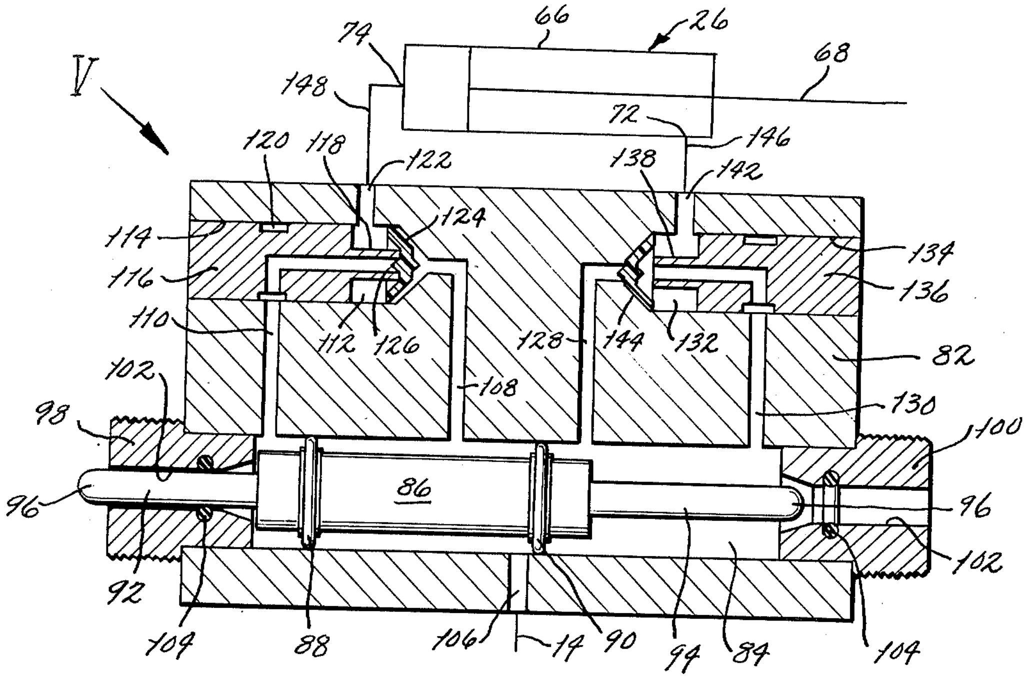
FIG. 6 is a sectional view of the valve for controlling the lock, with the valve element in one of its end positions.

Referring now to the drawings (FIG. 1), L designates a lock which is used to secure a door D in a door frame F located in a wall W so as to prevent passage through the door opening formed in the wall W by the frame F. The lock L is set into a mortise 2 located along the free edge of the door and operated by compressed air derived from a source located remote from the door D and frame F. Both the door D and frame F are conventional with the latter having a hinge jamb 4 and a strike jamb 6. The door D is attached to the hinge jamb 4 by a pair of full mortise hinges 8, and also by a so-called air hinge 10 which is located between the two full mortise hinges 8.

The air hinge 10 also has the full mortise configuration, and in contrast to the hinges 8 it further has the capability of transmitting compressed air from the frame F to the door D. To this end, the hinge 10 has one leaf set into a mortise in the hinge jamb 4 and another leaf set into a mortise in the back edge of the door D. Each leaf contains an air passage and these passages are connected through the hinge pin that connects the two leaves, the hinge pin in this instance being hollow. The leaf on the hinge jamb 6 is connected with an air line 12 (FIG. 1) that is concealed within the wall W and that air line extends to a source of compressed air. The air line contains a conventional valve which may be manually or electrically operated and is usually controlled at a location remote from the door D. Similarly, the hinge leaf on the door D is connected with an air line 14 that extends through the door to the lock L. Actually, the air line 14 is located in a hole 16 that is bored transversely through the door D from the mortise which accommodates the air hinge 10 to the mortise 2 for the lock L. Hence pressurized air from the remote source is delivered to the lock L through the air line 12, the air hinge 10, and the air line 14 in that order. A suitable air hinge 10 is disclosed in U.S. Pat. No. 3,872,541.

The lock L is set into the mortise 2 that opens out of the free edge of the door D, and it includes (FIGS. 2–5) a case 20 and a face plate 22 along the front of the case 20. When the lock L is installed in the door D, only the face plate 22 is exposed along the free edge of the door. Within the case 20 is a bolt 24 that slides between extended and retracted positions. When in the retracted position (FIG. 2), the front face of the bolt 24 is flush with the exposed surface of the face plate 22 and hence does not interfer with movement of the door D out of and into the door frame F. However, when in the extended condition (FIG. 4), the bolt 24 projects substantially beyond the face plate 22 and the free edge of the door D. Moreover, when the door D is closed, the bolt 24 aligns with a keeper or strike 25 on the strike jamb 6, so that upon being extended, the bolt 24 will project into the strike 25 and thereby prevent the door D from opening. The bolt 24 is moved between its extended and retracted positions by an air cylinder 26 or by a lock cylinder 28, both of which are connected with the bolt 24 through a coupling mechanism 30.

The coupling mechanism 30 includes (FIGS. 2 & 4) a tail portion 32 formed integral with the bolt 24 and extended rearwardly from it into the case 20. The tail portion 32 has a pin 34 passing completely through it, and this pin fits into a horizontal guide slot 36 (FIG. 5) within one side wall of the case 20. Thus, the tail portion 32 can move to and fro in the horizontal direction, but not in the vertical direction. Opening out of the opposite side of the tail portion 32 is a recess 38 having straight shoulders 40 along its forward and rear ends. Behind the recess 38, the tail portion 32 has another pin 42 which projects toward the opposite side wall on the case 20.

Aside from the tail portion 32 on the bolt 24, the coupling mechanism 30 further includes a hub 44 (FIGS. 2–5) having cylindrical journals 45 at its ends, and these journals fit into the side walls of the case 20 immediately above the tail portion 32, thus enabling the hub 44 to rotate within the case 20. The hub 44 has an arm 46 projected downwardly from it, and this arm at its end is bifurcated, it having one tine 48 that is located within the recess 38 of the tail portion 32 and another tine 50 that is located outside the recess 38 (FIG. 5). Extended through the bifurcated portion of the arm 46 is a spring wire 52 having its forward end secured to a mounting stud 54 in the case and its opposite end directed beneath the pin 42 on the tail portion 32. The spring wire 52 urges the arm 46 upwardly and hence applies a torgue to the hub 44. When the bolt 24 is extended, the torgue is directed counterclockwise and when the bolt 24 is retracted the torgue is directed clockwise, since between the extended and retracted positions for the bolt 24, the arm 46 passes through a bottom center position. In this regard, when the bolt 24 is in its retracted position (FIG. 2), the back of the tine 48 is against the back shoulder 40 of the recess 38, it being maintained in that position by the spring wire 52. Therefore, when the bolt 24 is moved forwardly the arm 46 is pushed forwardly, causing the hub 44 to rotate counterclockwise. After the arm 46 passes its bottom center position, the spring wire 52 urges it upwardly and causes the front of the tine 48 to bear against the forward shoulder 40 of the recess 38 (FIG. 4). Indeed, the angle assumed by the arm 46 is so great in comparison to the bottom center position that a rearwardly directed force applied to the slide will not rotate the arm 46 (FIG. 5). As a consequence, the slide 24 is locked in its extended position. The hub 44 further has a pair of wings 56 which extend generally upwardly from it in the direction opposite from the arm 46.

Completing the coupling mechanism 30 is a slide 60 (FIGS. 2 & 4) that lays over the tail portion 32 as well as over the arm 46 of the hub 44 and projects out of the back wall of the case 20. The slide 60 has a cutout 62 in which the other tine 50 of the arm 46 if received and behind the cutout 62 is further provided with a horizontal slot 64 into which the pin 42 on the tail portion 32 projects. The positions of the cutout 62 and slot 64 are such that when the slide 60 is pushed forwardly, it bears against the tine 50 along the edge of the cutout 62 and causes the arm 46 to move forwardly with the arm 46 bearing against the tail portion 32 at the other tine 48 so as to likewise drive the tail portion 32 forwardly. The bolt 24, being attached to the tail portion 32 moves to its extended position (FIG. 4). On the other hand, when the slide 60 is pulled rearwardly, it bears against the tine 50 at the forward edge of its cutout 62, causing the arm 46 to move clockwise and out of the position in which it blocks the bolt 24. Thereafter, the forward end of the slot 64 comes against the pin 42 and pulls the tail portion 32 rearwardly, moving the bolt 24 into its retracted position (FIG. 2). The slide 60 is moved to and fro by the air cylinder 26.

The air cylinder 26 (FIGS. 2 & 4) projects from the rear of the case and includes a barrel 66 and a piston rod 68 that extends out of one end of the barrel 66. The barrel 66 is attached to the case 20 by a bracket 70 that maintains piston rod 68 horizontal and aligned with the slide 60 of the coupling mechanism 30. Indeed, the end of piston rod 68 threads into the slide 60 so the two move in unison. The barrel 66 has a port 72 at its forward or rod end and another port 74 at its rear or cap end. Pressurized air introduced into the port 74 will move the piston rod 68 and slide 60 forwardly, thereby causing the bolt 24 to move to its extended position. Conversely, pressurized air introduced into the port 72 will move the rod 68 and slide 60, rearwardly, causing the bolt 24 to move to its retracted position.

The lock cylinder 28 is also capable of extending and retracting the bolt 24, and it threads into either side wall of the case 20 immediately above the hub 44. The cylinder 28 is conventional and includes (FIGS. 2 & 4) a core 76 which receives a key and is capable of being rotated only when the proper key is inserted into it. The core 76 at its rear end is fitted with an actuating tab 78 that aligns with the wings 56 on the hub 44. When the bolt 24 is extended, the hub 44 assumes one position and in that position only one of the wings 56 is presented in the path of the tab 78. When the core 76 is turned to bring the tab 78 against the extended wing 56, the entire hub 44 rotates and moves the bolt 24 to its retracted position. In that position the other wing 56 lies in the path of the tab 78. Now, when the core 76 is rotated in the opposite direction, the tab 78 will come against the other wing 56 and rotate the hub 44 counterclockwise causing the bolt 24 to extend. Thus, by the means of the lock cylinder 28 the bolt 24 may be extended or retracted manually.

The pressurized air from the single air line 14 in the door D is directed to a control valve V (FIGS. 2 & 4) at the lock L, and the valve V in turn directs the air to either the port 72 or the port 74 on the air cylinder 26. Actually the valve V alternates the supply of pressurized air between the two ports 72 and 74, directing it to one, then the other, then back to the first, etc. To achieve this end, the valve V resets itself each time pressurized air is directed to it, so that during the subsequent actuation the pressurized air will be directed to the opposite port 72 or 74, whatever may be the case. The valve V may be located in the case 20 of the lock L.

The valve V includes (FIGS. 6 & 7) a valve body or block 82 having a chamber in the form of a bore 84 extended through it, and within this bore is a valve element in the form of a spool 86 having two spaced apart O-ring seals 88 and 90 which wipe the cylindrical surface of the bore 84. Extended axially from one end of the spool 86 is a sealing plunger 92 and likewise extended axially from the opposite end is another sealing plunger 94. The plungers 92 and 94 are equal in length and have domed ends 96. Fitted into the ends of the bore 84 are bushings 98 and 100, each having a bore 102 extended through it and an O-ring seal 104 in the bore. The bores 102 are large enough to loosely accommodate the plungers 92 and 94 and at their inner ends flare outwardly. The seals 104 are small enough to seal against the outside cylindrical surfaces of the plungers 92 and 94. The spool 86 moves to and fro within the bore 84 between two end positions. In one end position (FIG. 6) the plunger 92 is projected through the bore 102 of the bushing 98 and adjacent end of the spool 86 from which the plunger 92 projects is at the bushing 98. The seal 104 within the bushing 98 seals against the cylindrical surface of the plunger 92. The plunger 94, on the other hand, is completely withdrawn from its bushing 100, its domed end 96 being located inwardly from the seal 104 of that bushing 100. In the other end position for the spool 86 (FIG. 7) the plunger 94 projects through the bore 102 in the bushing 100, while the O-ring seal 104 in the bushing 100 seals against the surface of the plunger 94. Moreover the end of the spool 86 from which the plunger 94 projects is at the inner end of the bushing 100, while the plunger 92 is completely withdrawn from the bore 102 in the other bushing 98. In that condition the domed end 96 of the plunger 92 is backed off from the O-ring seal 104 in the bushing 98. The spacing between the two O-ring seals 88 and 90 on the spool 86 is such that neither crosses the midpoint of the bore 84 as the spool 86 moves between its end positions.

The valve body is further provided with an inlet port 106 to which the air line 14 in the door D is connected. The port 106 opens into the bore 84 midway between the ends of the bore 84. Irrespective of the position of the spool 86, the inlet port 106 is always between the two O-ring seals 88 and 90 of the spool 86.

That half of the valve block 82 into which the bushing 98 is fitted contains a transfer line 108 that leads away from the bore 84 and a return line 110 that leads toward the bore 84. The location at which the transfer line 108 opens into the bore 84 is slightly offset from the inlet port 106, its precise position being such that the O-ring seal 88 on the spool 86 will be located between the transfer line 108 and the inlet port 106 when the spool 86 is against the bushing 100. The return passage 110 empties into the bore 84 adjacent to the inner end of the bushing 98 and is always located beyond the O-ring seal 88 irrespective of the position of the spool 86.

The transfer passage 108 extends radially away from the bore 84 for a substantial distance and then turns axially so that its terminal portion is parallel to the bore 84. This portion of the transfer passage 108 opens into a valve chamber 112 the walls of which diverge away from the end of the transfer passage 108 so that the chamber 112 at its one end possesses a conical configuration. The conical wall of the chamber 112 merges into a cylindrical bore 114 which opens out of the valve block 82 adjacent to the bushing 98, and the bore 114 has a plug 116 fitted tightly into it. The plug 116, however, does not occupy the entire bore 114 so that the valve chamber 112 has both conical and cylindrical walls. The plug 116 contains a portion of the return passage 110 and at its inner end is provided with an axially directed nose 118 which projects toward the end of the transfer passage 108.

The return passage 110 originates within the plug 116 and is continous through the plug 116 and valve block 82 to the spool bore 84. In particular, the inlet end of the return passage 110 is located within the nose 118 of the plug 116, that is, directly opposite the terminal end of the transfer passage 108. The return passage 110 continues axially through the plug 116 and then turns radially outwardly where it opens into an annular groove 120 that aligns with the portion of the return passage 110 in the valve block 82.

The valve block 82 further contains an outlet port 122 that opens into the valve chamber 112 outwardly from the nose 118 on the plug 116. The valve chamber 112 contains an elastomeric seal diaphragm 124 that is somewhat conical in shape, with the convergence being toward the terminal end of the transfer passage 108. Moreover, the back face of the seal diaphragm 124 is dished out or concave and receives the nose 118 of the plug 116 (FIG. 6). At its periphery, the diaphragm 124 bears against the cylindrical side wall of the valve chamber 112. At the center of its concave surface the diaphragm 124 has a slight nib 126 which projects rearwardly into the end of the return passage 110 within the nose 118 of the plug 116. The valve chamber 112 and diaphragm 124 constitute a back pressure valve, while the diaphragm 124 itself constitutes diverting means within the valve.

Figure 7:
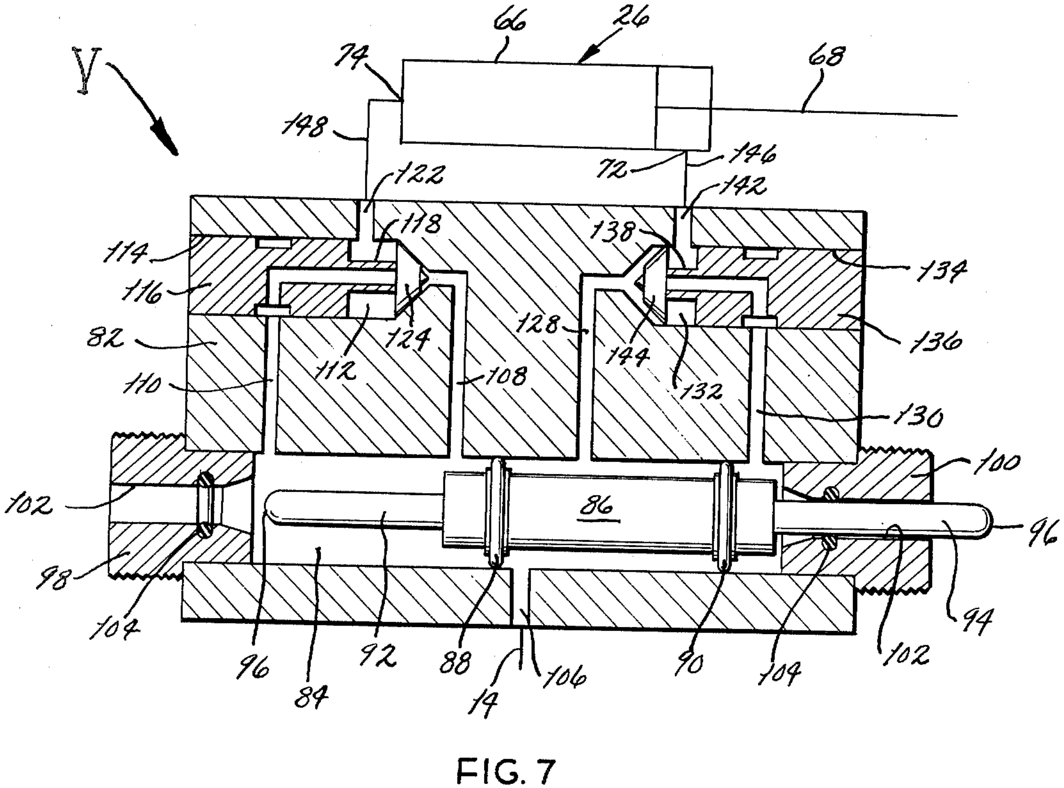
FIG. 7 is a sectional view of the valve with the valve element in its other end position.

Assuming that the spool 86 is against the bushing 98 (FIG. 6) and that pressurized air is applied to the inlet port 106, then that air will flow through the portion of the spool bore 84 located between the two O-ring seals 88 and 90 and will further pass through the transfer passage 108 to the valve chamber 112 where it will force the elastomeric diaphragm 124 rearwardly, causing it to seal against the end face of the nose 118 and to further deflect so as to place the outlet port 122 in communication with the transfer passage 108. As a consequence, the pressurized air flows into the outlet port 122 and to the cylinder 26. On the other hand, when the pressure is released at the inlet port 106 and a back pressure exists at the outlet port 122, the diaphragm 124 will move away from the nose 118 and seal against the conical surface of the valve chamber 112 (FIG. 7). This blocks the end of the transfer passage 108 and exposes the end of the return passage 110 to the valve chamber 112 and outlet port 122. As a consequence, the return line 110 is pressurized and the pressure so developed forces the spool 86 toward the bushing 100. Indeed, the spool 86 moves until its end bears against the inner end of the bushing 100, and when that occurs, the plunger 92 is withdrawn from the bore 102 in the bushing 98 so that the return passage 110 is exhausted through the bore 102 in the bushing 98. Moreover, the O-ring seal 88 is now disposed between the inlet port 106 and the transfer passage 108, thereby isolating the transfer passage 108 from the inlet port 106.

That half of the valve block 82 into which the other bushing 100 is fitted likewise contains a transfer passage 128, a return passage 130, a valve chamber 132 and connected bore 134, a plug 136 located within the bore 134 and having a nose 138 as well as a portion of the return passage 130 extended through it, an outlet port 142, and a diaphragm 144 within the valve chamber 132. Moreover, the transfer passage 128 opens into the spool bore 84 at a location that permits the O-ring seal 90 to isolate it from the inlet port 106 when the spool 86 is against the bushing 98 (FIG. 6) yet permits it to be in communication with the inlet port 106 when the spool 86 is against the other bushing 100 (FIG. 7). The valve chamber 132 and diaphragm 144 constitute another back pressure valve, while the diaphragm 144 itself constitutes diverting means.

The port 72 at the rod end of the air cylinder 26 is connected to the outlet port 142 of the valve block 82 through a short air line 146 (FIG. 2). Likewise, the port 74 at the cap end of the cylinder 30 is connected to the outlet port 132 of the valve block 82 through another short air line 148.

OPERATION

The door D is secured in the door frame F by projecting the bolt 24 from the lock L and into the strike 25 on the door frame F (FIG. 4). This may be achieved in two ways. First, the bolt may be extended by turning the core 76 of the lock cylinder 28 in the door D. On the other hand, the bolt 24 may be projected from a remote location by directing a pressurized air to the lock L, or more specifically to the air cylinder 26 of the lock L. Similarly, the bolt 24 may be retracted by turning the core 76 in the lock cylinder 28 or directing pressurized air to the air cylinder 26 of the lock L.

To operate the lock L manually, one merely inserts the proper key into the core 76 of the lock cylinder 28. It the bolt 24 is retracted, the core 76 is turned in the direction which brings the tab 78 on the end of the core 76 to the upstanding wing 56 on the rotatable hub 44 for the coupling mechanism 30, such that the arm 46 swings forwardly past its below center position, in which case the bolt 24 is driven outwardly to its extended position. This presents the other wing 56 in an upstanding position, so that when the core 76 is turned in the opposite direction, the tab 78 will engage the other wing 56 and rotate the hub 44 in the opposite direction, thus moving the bolt 24 into its retracted position. The spring wire 52 tends to move the arm 46 in the direction in which it is urged, once the arm 46 passes the bottom center position.

While the lock L may be manually operated at the door D, it also may be actuated from a remote location by energizing the air cylinder 26, thus enabling the door D to be locked or unlocked from that remote location. More specifically, when the bolt 24 is in its retracted position (FIG. 2), the piston rod 68 of the air cylinder 26 is likewise retracted and the spool 86 of the control valve V is located against the bushing 98 (FIG. 6). When it is desired to lock the door, pressurized air is directed through the air line 12, the air hinge 10, and the air line 14 to the valve V, the air entering the valve V through the inlet port 106. The air pressurizes the portion of the spool bore 84 located between the two O-ring seals 88 and 90 and likewise pressurizes the transfer passage 108. The pressurized air in the transfer passage 108 deflects the elastomeric diaphragm backwardly against the nose 118 on the plug 116 and this places the outlet port 122 in communication with the transfer line 108 and blocks the return passage 110. Thus, pressurized air flows into the air line 148 leading away from the outlet port 122 and hence into the cap end of the barrel 66, forcing the piston rod 68 outwardly. The piston rod 68 in turn moves the slide 60, which in turn causes the hub 44 to rotate and extend the bolt 24 into the strike 25 on the door frame F, thus securing the door D.

When the piston rod 68 is fully extended, a high back pressure develops within the barrel 66 and the air line 146 leading to it, but the diaphragm 124 remains against the nose 118 and continues to block the end of the return passage 110. However, once the pressure at the inlet port 106 is released, the elastomeric diaphragm 124 drifts forwardly toward the forward end of the valve chamber 112 and seals the terminal end of the transfer passage 108. At the same time, it opens the end of the return passage 110 so that the pressurized end of the barrel 66 is now in communication with the portion of the spool bore 86 located between the bushing 98 and the O-ring seal 88. In other words, the end of the spool 86 is now exposed to the back pressure of the air cylinder 26. The pressurized air forces the spool 86 toward the bushing 100, and indeed the spool 86 moves until its end is against the bushing 100 (FIG. 7). During the initial increment of movement, the plunger 94 fits into the bore 102 of the bushing 100 and a seal is established with the O-ring seal 104 in that bushing. The plunger 92 at the opposite end of the spool 86, however, remains within the seal 104 of the bushing 98 so that no air escapes through the bushing 98. Consequently, the spool 86 continues to move toward the bushing 100. During the last increment of movement, the plunger 92 moves out of the O-ring seal 104 in the bushing 98 so that the remainder of the pressurized air escapes through the bore 102 in the bushing 98. However, by this time the opposite end of the spool 86 is at the other bushing 100. The valve V remains in this condition while the piston rod 68 and the lock bolt 24 are in their extended positions, there being no pressurized air supplied to the inlet port 106 of the valve V. In other words, the inlet port 106 or more precisely the line 12 leading to it is vented so that the inlet port 106 is at atmospheric pressure.

When it is desired to release the door, that is, to retract the lock bolt 24, another charge of pressurized air is directed through the air line 12, the air hinge 10, and the air line 14 to the inlet port 106 of the valve V. This air passes through the spool bore 84 and transfer line 128 to the other valve chamber 132 where it displaces the elastomeric diaphragm 144 against the nose 138 of the plug 136 so as to seal the return passage 130 (FIG. 7). The pressurized air flows through the air line 148 to the barrel 66 of the air cylinder 26 and drives the piston rod 68 rearwardly. The piston rod 68 moves the slide 60 rearwardly which in turn retracts the latch bolt 24. When the piston rod 68 reaches its fully retracted position, a back pressure develops and the flow of air through the transfer passage 128 and the air line 148 ceases. Once the air pressure is released at the inlet port 106, the elastomeric diaphragm 144 drifts inwardly and seals the end of the transfer passage 128. This exposes the return line 130 to the back pressure within the air line 148 so that the spool bore 84 is now pressurized between the O-ring seal 90 and the bushing 100. Therefore, the spool 86 moves toward the bushing 98 until the plunger 94 passes out of the O-ring seal 104 in the bushing 100, in which case the return line 130 is vented and the remainder of the pressurized air is exhausted through the bore 102 in the bushing 100 (FIG. 6). This places the spool 86 in its initial position, and the sequence may be repeated.

Thus, the valve V directs pressurized air alternately to the ports 72 and 74 on the cylinder so that with each charge of air the piston rod 68 is moved in a different direction.

While the valve V is ideally suited for controlling the pneumatically operated lock L, it is also suited for use in connection with other pneumatically operated devices which are capable of receiving pressurized air at two locations. Also, while pressurized air is perhaps the most convenient fluid for energizing the air cylinder 26, just about any fluid will suffice, whether it be a gas or a liquid.

This invention is intended to cover all changes and modifications of the example of the invention herein chosen for purposes of the disclosure which do not constitute departures from the spirit and scope of the invention.

What is claimed is:

1. A valve comprising: a valve body having a spool bore, an inlet passage that opens into the spool bore, first and second outlets, first and second valve chambers connected with the first and second outlets, respectively, first and second transfer passages extended from the spool bore to the first and second valve chambers, respectively, first and second return passages extended from the first and second valve chambers, respectively, to the spool bore and opening into the spool bore beyond the transfer passages; a spool in the spool bore generally between the ends of the two return passages and being capable of shifting therein between first and second positions, the spool being configured to direct pressurized fluid from the inlet passage to the first transfer passage when in the first position and to direct pressurized fluid from the inlet passage to the second transfer passage when in the second position, the spool further being configured such that its ends are continually exposed to the ends of the return passages such that a pressurized fluid in either return passage will exert an axially directed force on the spool, with pressurized fluid supplied through the first return passage urging the spool to its second position and pressurized fluid applied through the second return passage urging the spool to its first position; and a blocking element in each valve chamber for blocking the return passage that opens into that valve chamber when pressurized fluid flows through the transfer passage and into the valve chamber and for alternatively blocking the transfer passage that opens into the valve chamber after a back pressure develops in fluid at the outlet passage for the valve chamber and pressurized fluid is no longer supplied to the inlet passage, whereby fluid under back pressure is diverted to the return passage for the valve chamber and exerts an axial force on the spool, with the force being directed such that it causes the spool to change position, so that successive applications of pressurized fluid to the inlet passage are alternatively directed to the first and second outlet passages.

2. A valve according to claim 1 wherein the transfer passage and the return passage for each valve chamber open into that valve chamber directly opposite to each other, and the blocking element is interposed between the ends of the return passage and the transfer passage.

3. A valve according to claim 2 wherein the blocking element in each valve chamber is formed from an elastomeric material and is convex on one surface with the convex surface being presented toward the end of the transfer passage.

4. A valve according to claim 1 wherein the spool carries means for venting the return passage that leads from the valve chamber opposite to that which is pressurized when the spool is in either of its end positions, whereby the back pressure which forces the spool to either end position is vented as the spool approaches that end position.

5. In combination with a double acting fluid cylinder having a port communicating with each end thereof, a valve comprising: a single inlet port connected to a source of pressurized fluid, a valve body having a cavity into which the inlet port opens and a pair of return passages opening into the cavity at the ends thereof and a pair of transfer passages opening into the cavity intermediate the ends of the cavity so that the return and transfer passages are arranged in sets, there being one return passage and one transfer passage in each set; a valve element shiftable in the cavity between end positions and in one end position directing pressurized fluid from the inlet port to the one transfer passage and in the other end position directing pressurized fluid from the inlet port to the other transfer passage; a separate back pressure valve connected with the return and transfer passages of each set and with one of the ports of the cylinder, each back pressure valve including a valve chamber into which the transfer passage and return passage for that back pressure valve opens and a blocking element in the valve chamber, the blocking element being configured to block the return passage for its back pressure valve when pressurized fluid passes through the transfer passage for its back pressure valve, whereby the pressurized fluid will flow from that transfer passage to the cylinder port that is connected to the back pressure valve, the blocking element further being configured to block the transfer passage for its back pressure valve and open the return passage for its back pressure valve when the pressure in the transfer passage drops and a back pressure develops at the cylinder port that is connected to the back pressure valve, whereby the back pressure is transmitted through the return passage to the cavity wherein it causes a force to be exerted on the valve element so that the valve element will shift therein.

6. The combination according to claim 5 wherein the valve element as it moves away from one end of the cavity and approaches the other end as a result of pressurized fluid being introduced into said one end of the cavity, vents said one end of the cavity so that the back pressure is released.

7. The combination according to claim 6 wherein the cavity is cylindrical, and the valve element is a spool that shifts axially in the cavity.

8. The combination according to claim 7 wherein the cavity is closed at its ends by bushings having bores therein which are smaller in diameter than the cavity; and wherein the spool has plungers projected axially from its ends and aligned with the reduced bores in the bushings, the plungers and spool being of such length that when the spool is in either end position the plunger at the corresponding end of the spool will be in the bushing at that end position and the plunger at the other end of the spool will be withdrawn from the bore of the bushing at the other end position, thus venting the other end of the cavity and the return passage which opens into it.

9. The combination according to claim 5 wherein the transfer and return passages for each valve chamber open into their respective valve chambers opposite to each other and the blocking element is interposed between the ends of the return and transfer passages.

10. A lock for securing a door in a door frame, said lock comprising: a case; a lock bolt in the case and being capable of shifting from a retracted position wherein it does not interfere with the frame to an extended position wherein it projects into the frame and secures the door; the combination of claim 5; and means for coupling the cylinder with the bolt such that the bolt is extended and retracted by the cylinder.

11. A lock according to claim 10 wherein the means for coupling the cylinder with the bolt includes means for locking the bolt in its extended position so that it cannot be forced into its retracted position by an inwardly directed force applied to the bolt itself, and means for releasing the means for locking when the cylinder exerts a force on the bolt.

12. A control valve comprising a valve body having a chamber therein, and an inlet, first and second transfer passages, and first and second return passages, all of which communicate with the chamber; a valve element in the chamber and being capable of moving between first and second positions therein, the valve element when in the first position placing the inlet and first transfer passage in communication and when in the second position placing the inlet and the second transfer passage in communication so that high pressure fluid applied to the inlet will be directed to either the first or the second transfer passages, depending on the position of the valve element, the valve element further being positioned in the chamber such that pressurized fluid admitted to the chamber from the first return passages will urge the valve element to its second position and pressurized fluid admitted to the chamber from the second return passage will urge the valve element to its first position; a first back pressure valve having a first outlet and being connected with the first transfer and return passages, the first back pressure valve including first diverting means for placing the first transfer passage in communication with the first outlet but not with the first return passage when the pressure in the first transfer passage exceeds the pressure in the first outlet and the first return passage and for alternately placing the first outlet in communication with the first return passage but not with the first transfer passage when the pressure in the first outlet exceeds the pressure in the first return and transfer passages; and a second back pressure valve having a second outlet and being connected with the second transfer and return passages, the second back pressure valve including second diverting means for placing the second transfer passage in communication with the second outlet but not with the second return passage when the pressure in the second transfer passage exceeds the pressure in the second outlet and for alternately placing the second outlet in communication with the second return passage, but not with the second transfer passage when the pressure in the second outlet exceeds the pressure in the second transfer and return passages.

13. A control valve according to claim 12 and further comprising means for venting the first return passage when the valve element reaches its second position and for venting the second return passages when the valve element reaches its first position.

14. A control valve according to claim 13 wherein the means for venting the return passages is carried by the valve element.

15. A control valve according to claim 12 wherein the chamber is a bore and the valve element is a spool that moves axially in the bore between the first and second positions.

16. A control valve according to claim 15 wherein the spool has first and second plungers projected axially from its ends in opposite directions and the valve body carries first and second bushings at the ends of the bore, when the spool is in its first position, the first plunger being in the first bushing and closing its end of the bore and the second plunger being out of the second bushing so as to vent its end of the bore, when the spool is in its second position, the second plunger being in the second bushing to close its end of the bore and the first plunger being out of the first bushing to vent its end of the bore.

* * * * *